United States Patent
Miyashita et al.

(10) Patent No.: US 9,899,701 B2
(45) Date of Patent: Feb. 20, 2018

(54) SULFIDE-BASED SOLID ELECTROLYTE FOR LITHIUM ION BATTERIES

(71) Applicant: Mitsui Mining & Smelting Co., Ltd., Tokyo (JP)

(72) Inventors: Norihiko Miyashita, Ageo (JP); Takashi Chikumoto, Ageo (JP); Hideaki Matsushima, Ageo (JP); Kenji Matsuzaki, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 15/326,238

(22) PCT Filed: Jun. 15, 2015

(86) PCT No.: PCT/JP2015/067151
§ 371 (c)(1),
(2) Date: Jan. 13, 2017

(87) PCT Pub. No.: WO2016/009768
PCT Pub. Date: Jan. 21, 2016

(65) Prior Publication Data
US 2017/0222257 A1    Aug. 3, 2017

(30) Foreign Application Priority Data
Jul. 16, 2014  (JP) .................... 2014-146174

(51) Int. Cl.
*H01M 10/0562* (2010.01)
*H01M 10/0525* (2010.01)
(Continued)

(52) U.S. Cl.
CPC ........ *H01M 10/0562* (2013.01); *C01B 25/14* (2013.01); *H01B 1/10* (2013.01);
(Continued)

(58) Field of Classification Search
CPC ......... H01M 10/0525; H01M 10/0562; H01M 4/131; H01M 4/134; H01M 4/525; H01M 4/625; H01M 4/382
See application file for complete search history.

(56) References Cited

U.S. PATENT DOCUMENTS 6,277,524 B1    8/2001    Kanno
8,075,865 B2    12/2011   Deiseroth et al.
(Continued)

FOREIGN PATENT DOCUMENTS

CN    101821199 A    9/2010
CN    101933189 A    12/2010
(Continued)

OTHER PUBLICATIONS

Rao, R. P., et al., "Studies of lithium argyrodite solid electrolytes for all-solid-state batteries", Phys. Status Solidi A 208, No. 8, pp. 1804-1807 (2011).
(Continued)

*Primary Examiner* — Karie O'Neill Apicella
(74) *Attorney, Agent, or Firm* — The Webb Law Firm (57) ABSTRACT

Proposed is a new sulfide-based solid electrolyte for lithium ion batteries, the sulfide-based solid electrolyte relating to a compound that has a cubic argyrodite type crystal structure and is represented by $Li_{7-x-2y}PS_{6-x-y}Cl_x$, and having excellent water resistance and oxidation resistance. Proposed is a sulfide-based solid electrolyte for lithium ion batteries, the sulfide-based solid electrolyte containing a compound that has a cubic argyrodite type crystal structure and is represented by compositional formula (1): $Li_{7-x-2y}PS_{6-x-y}Cl_x$, in which compositional formula, conditions: $0.8 \leq x \leq 1.7$ and $0 < y \leq -0.25x+0.5$ are satisfied.

15 Claims, 6 Drawing Sheets

(51) Int. Cl.
  *H01B 1/10* (2006.01)
  *C01B 25/14* (2006.01)

(52) U.S. Cl.
  CPC ..... *H01M 10/0525* (2013.01); *C01P 2002/30* (2013.01); *C01P 2006/40* (2013.01); *H01M 2300/008* (2013.01)

(56) References Cited

U.S. PATENT DOCUMENTS

| | | | |
|---|---|---|---|
| 2010/0290969 A1* | 11/2010 | Deiseroth | C01D 15/00 423/300 |
| 2013/0177821 A1 | 7/2013 | Tsuchida et al. | |
| 2014/0302382 A1 | 10/2014 | Kambara et al. | |

FOREIGN PATENT DOCUMENTS

| | | |
|---|---|---|
| JP | 3184517 B2 | 7/2001 |
| JP | 2001-250580 A | 9/2001 |
| JP | 2002-109955 A | 4/2002 |
| JP | 3744665 B2 | 2/2005 |
| JP | 2010-540396 A | 12/2010 |
| JP | 2011-096630 A | 5/2011 |
| JP | 2012-043646 A | 3/2012 |
| JP | 2012-48971 A | 3/2012 |
| JP | 2014-093260 A | 5/2014 |
| JP | 2015-018726 A | 1/2015 |
| WO | 2009/094524 A1 | 7/2009 |
| WO | 2013/069243 A1 | 5/2013 |
| WO | 2013/099834 A1 | 7/2013 |
| WO | 2014/054165 A1 | 4/2014 |

OTHER PUBLICATIONS

Boulineau, Sylvain, et al., "Mechanochemical synthesis of Li-argyrodite Li6PS5X (X = Ci, Br, I) as sulfur-based solid electrolytes for all solid state batteries application", Solid State Ionics 221, pp. 1-5 (2012).

Rao, R. Prasada, et al., "Formation and conductivity studies of lithium argyrodite solid electrolytes using in-situ neutron diffraction", Solid State Ionics 230, pp. 72-76 (2013).

* cited by examiner

SULFIDE-BASED SOLID ELECTROLYTE FOR LITHIUM ION BATTERIES

CROSS-REFERENCE TO RELATED APPLICATIONS

This application is the United States national phase of International Application No. PCT/JP2015/067151 filed Jun. 15, 2015, and claims priority to Japanese Patent Application No. 2014-146174 filed Jul. 16, 2014, the disclosures of which are hereby incorporated in their entirety by reference.

TECHNICAL FIELD

The present invention relates to a sulfide-based solid electrolyte for lithium ion batteries, which can be suitably used as a solid electrolyte for lithium ion batteries.

BACKGROUND ART

Lithium ion batteries are secondary batteries having a structure in which, during charging, lithium dissolves out as ions from a positive electrode and migrates to the negative electrode to be stored therein; and on the contrary, during discharging, lithium ions return from the negative electrode to the positive electrode. Since lithium ion batteries have features such as high energy density and a long life cycle, lithium ion batteries are widely used as power supplies for domestic appliances such as video cameras; portable electronic devices such as laptop computers and mobile telephones; and electric tools such as power tools. Recently, lithium ion batteries are also applied to large-sized batteries that are mounted in electric vehicles (EV), hybrid electric vehicles, and the like.

A lithium ion battery of this kind is configured to include a positive electrode, a negative electrode, and an ion conducting layer interposed between these two electrodes, and as this ion conducting layer, a separator formed from a porous film of polyethylene, polypropylene or the like, which is filled with a non-aqueous liquid electrolyte, is generally used. However, since such an organic liquid electrolyte which uses a flammable organic solvent as the solvent is used as an electrolyte, improvements in view of structure and material for preventing volatilization or leakage are needed, and installation of a safety device for suppressing temperature increase at the time of a short circuit and improvements in view of structure and material for preventing a short circuit are also needed.

In contrast, an all-solid lithium ion battery formed by solidifying the whole battery using a solid electrolyte that uses lithium sulfide ($Li_2S$) or the like as a starting material, does not use a flammable organic solvent. Therefore, simplification of safety devices can be attempted, and the battery can be made as a battery which is excellent in terms of production cost or productivity. Also, the battery has a feature that the solid electrolyte can be laminated in series in a cell, and thus voltage increase can be promoted. Furthermore, in a solid electrolyte of this kind, since nothing but Li ion moves, side reactions caused by movement of anions do not occur, and it is expected that this leads to enhancement of safety and durability.

A solid electrolyte used in such a battery is required to have high ionic conductivity as far as possible and to be stable chemically and electrochemically. For example, lithium halide, lithium nitride, lithium oxoate, and derivatives of these compounds are known as candidate materials for the solid electrolyte.

In regard to solid electrolytes of this kind, for example, Patent Document 1 discloses a sulfide-based solid electrolyte obtainable by incorporating a high temperature lithium ion conductive compound formed from lithium phosphate ($Li_3PO_4$), into a lithium ion conductive sulfide glass represented by general formula: $Li_2S$—X (provided that X represents at least one sulfide among $SiS_2$, $GeS_2$, and $B_2S_3$).

Furthermore, Patent Document 2 discloses, as a material that is crystalline and exhibits a very high ionic conductivity such as an ionic conductivity at room temperature of $6.49 \times 10^{-5}$ $Scm^{-1}$, a sulfide-based solid electrolyte characterized by including a lithium ion conductive substance as a composite compound represented by general formula: $Li_2S$—$GeS_2$—X (provided that X represents at least one of $Ga_2S_3$ and ZnS).

Patent Document 3 discloses a lithium ion conductive sulfide ceramic having high lithium ion conductivity and a high decomposition voltage, the sulfide ceramic containing $Li_2S$ and $P_2S_5$ as main components and having a composition in which $Li_2S$=82.5 to 92.5 and $P_2S_5$=7.5 to 17.5, as expressed in mol %, and preferably a composition (compositional formula: $Li_7PS_6$) in which $Li_2S/P_2S_5$=7 as a molar ratio.

Patent Document 4 discloses a lithium ion conductive material having a silver germanium sulfide mineral type crystal structure represented by chemical formula: $Li^+_{(12-n-x)}B^{n+}X^{2-}_{(6-x)}Y^-_x$ (wherein $B^{n+}$ represents at least one selected from P, As, Ge, Ga, Sb, Si, Sn, Al, In, Ti, V, Nb, and Ta; $X^{2-}$ represents at least one selected from S, Se, and Te; and $Y^-$ represents at least one selected from F, Cl, Br, I, CN, OCN, SCN, and $N_3$; while $0 \leq x \leq 2$).

Patent Document 5 discloses, as a solid compound that can be produced into a single layer in addition to the high fluidity of lithium ions, a lithium silver germanium sulfide mineral represented by general formula (I): $Li^+_{(12-n-x)}B^{n+}X^{2-}_{6-x}Y^-_x$, and in this formula, $B^{n+}$ is selected from the group consisting of P, As, Ge, Ga, Sb, Sn, Al, In, Ti, V, Nb and Ta; $X^{2-}$ is selected from the group consisting of S, Se and Te; and $Y^-$ is selected from the group consisting of Cl, Br, I, F, CN, OCN, SCN, and $N_3$, while $0 \leq x \leq 2$.

CITATION LIST

Patent Document

Patent Document 1: JP 3184517 B2
Patent Document 2: JP 3744665 B2
Patent Document 3: JP 2001-250580 A
Patent Document 4: JP 2011-96630 A
Patent Document 5: JP 2010-540396 A The inventors of the present invention paid attention to a compound represented by $Li_{7-x}PS_{6-x}Cl_x$ and having a cubic argyrodite type crystal structure, as a solid electrolyte material used for lithium ion batteries.

However, since such a compound has very high reactivity with moisture or oxygen, when an all-solid lithium ion battery is assembled using the compound as a solid electrolyte for lithium ion batteries, the operation of assembling the all-solid lithium ion battery needs to be carried out in an environment such as a glove box where an inert gas having an ultralow dew point is supplied. Thus, the compound has a problem to be industrially utilized.

SUMMARY OF THE INVENTION

Thus, the present invention relates to a sulfide-based solid electrolyte for lithium ion batteries, the solid electrolyte containing a compound which has a cubic argyrodite type crystal structure and is represented by formula: $Li_{7-x}PS_{6-x}Cl_x$, and the invention is to propose a new sulfide-based solid electrolyte for lithium ion batteries, the sulfide-based solid electrolyte having improved water resistance and oxidation resistance so that, for example, the operation of assembling an all-solid lithium ion battery can be carried out even in an environment where an inert gas having an ultralow dew point is not supplied, such as a dry room.

The present invention proposes a sulfide-based solid electrolyte for lithium ion batteries, the sulfide-based solid electrolyte containing a compound that has a cubic argyrodite type crystal structure and is represented by compositional formula (1): $Li_{7-x-2y}PS_{6-x-y}Cl_x$, in which compositional formula, the conditions: $0.8 \leq x \leq 1.7$ and $0 < y \leq -0.25x+0.5$ are satisfied.

The sulfide-based solid electrolyte proposed by the present invention has markedly excellent water resistance and oxidation resistance compared to a sulfide-based solid electrolyte containing a compound represented by formula: $Li_{7-x}PS_{6-x}Cl_x$, and since deterioration of characteristics occurs at a reduced level even if the sulfide-based solid electrolyte is handled in dry air, for example, the operation of assembling an all-solid lithium ion battery can be carried out even in an environment where an inert gas having an ultralow dew point is not supplied, such as a dry room.

DETAILED DESCRIPTION AND MODE(S) FOR CARRYING OUT THE INVENTION

Figure 1:
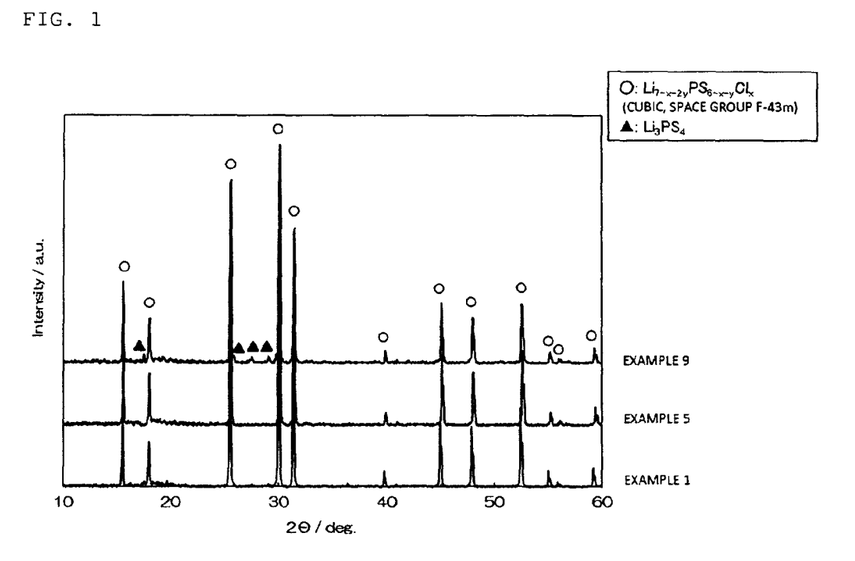
FIG. 1 is a diagram showing the XRD patterns of samples obtained in Examples 1, 5 and 9.
Figure 2:
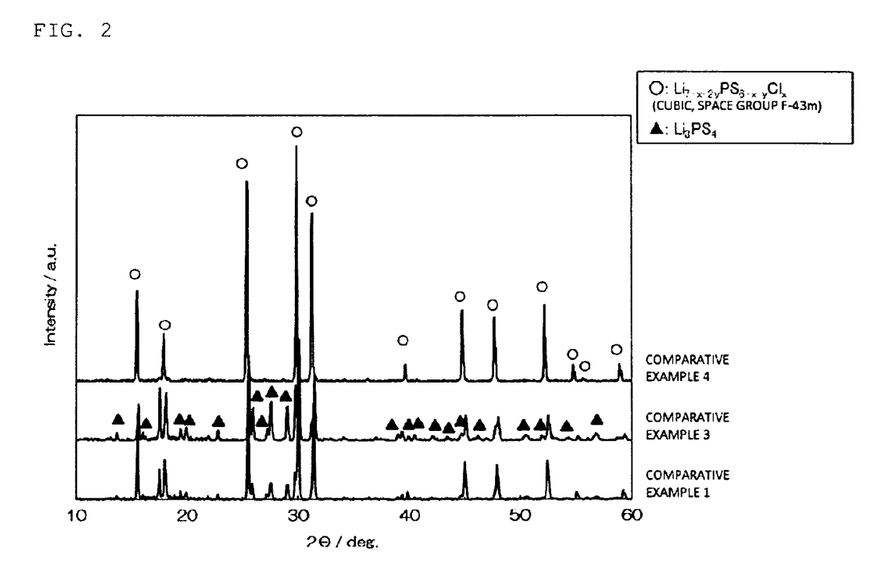
FIG. 2 is a diagram showing the XRD patterns of samples obtained in Comparative Examples 1, 3 and 4.
Figure 3:
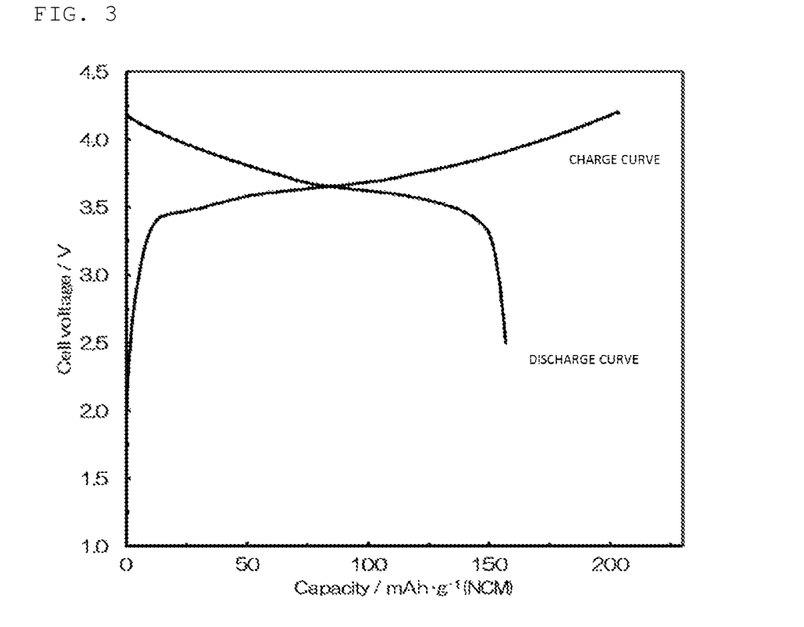
FIG. 3 is a diagram illustrating the charge-discharge characteristics obtained in the first cycle when an all-solid battery cell was produced using a sample obtained in Example 2, and the cell was evaluated.
Figure 4:
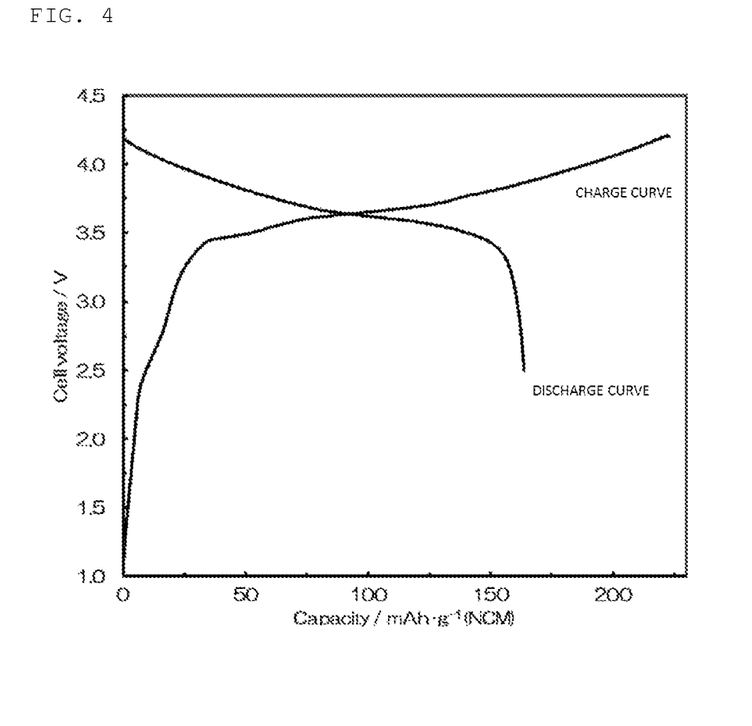
FIG. 4 is a diagram illustrating the charge-discharge characteristics obtained in the first cycle when an all-solid battery cell was produced using a sample obtained in Example 6, and the cell was evaluated.
Figure 5:
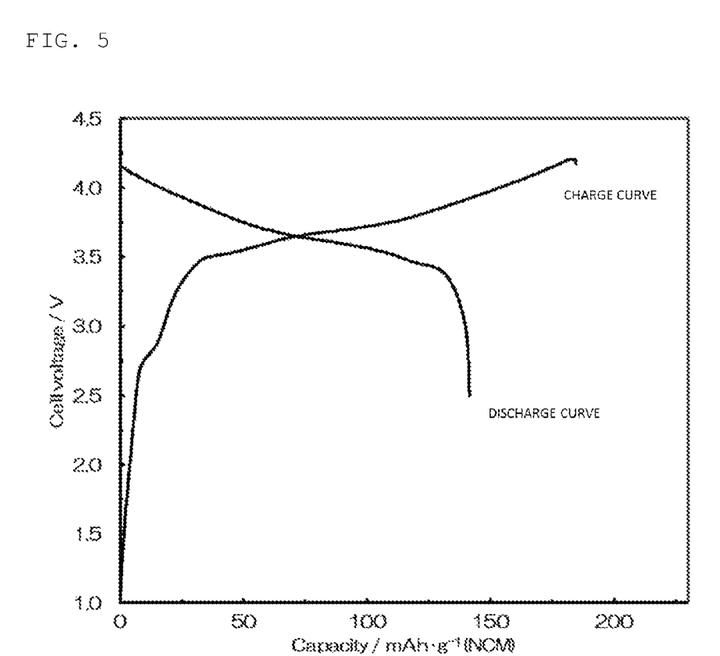
FIG. 5 is a diagram illustrating the charge-discharge characteristics obtained in the first cycle when an all-solid battery cell was produced using a sample obtained in Comparative Example 1, and the cell was evaluated.
Figure 6:
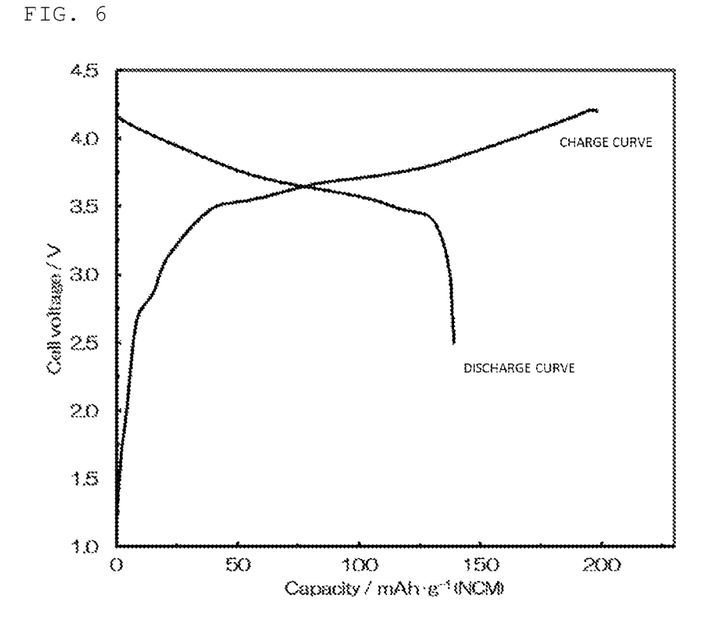
FIG. 6 is a diagram illustrating the charge-discharge characteristics obtained in the first cycle when an all-solid battery cell was produced using a sample obtained in Comparative Example 5, and the cell was evaluated.

Hereinafter, embodiments of the present invention will be described in detail. However, the scope of the present invention is not intended to be limited to the embodiments explained below.

The sulfide-based solid electrolyte related to the present embodiment (referred to as "present solid electrolyte") is a sulfide-based solid electrolyte containing a compound that has a cubic argyrodite type crystal structure and is represented by compositional formula (1): $Li_{7-x-2y}PS_{6-x-y}Cl_x$.

In regard to the compositional formula (1): $Li_{7-x-2y}PS_{6-x-y}Cl_x$, x representing the content of Cl element is preferably 0.8 to 1.7. When x is 0.8 to 1.7, it is possible to obtain the cubic argyrodite type, and since the production of phases other than the argyrodite type phase, such as $Li_3PS_4$ and LiCl, can be suppressed, lithium ion conductivity can be increased.

From such a viewpoint, x is preferably 0.8 to 1.7, and above all, x is preferably 1.0 or more and 1.6 or less, and particularly preferably 1.2 or more and 1.4 or less.

Furthermore, "y" in the compositional formula (1): $Li_{7-x-2y}PS_{6-x-y}Cl_x$ is a value that relatively exhibits how small the amount of the $Li_2S$ component is in the stoichiometric composition, and it is preferable that the condition: $0 < y \leq -0.25x+0.5$ is satisfied.

When y satisfies the expression described above, the retention ratio for electrical conductivity after exposure to dry air can be increased to 50% or higher. Furthermore, it has been confirmed that the electrical conductivity after exposure to dry air can be increased to $1.0 \times 10^{-3}$ S·cm$^{-1}$ or higher, which is preferable.

Furthermore, in regard to the compositional formula (1), when the conditions: $1.0 \leq x \leq 1.4$ and $0 < y \leq -0.2x+0.4$ are satisfied, the retention ratio for electrical conductivity after exposure to dry air can be increased to 70% or higher, and it has been confirmed that the electrical conductivity after exposure to dry air can be increased to $2.0 \times 10^{-3}$ S·cm$^{-1}$ or higher, which is more preferable.

Furthermore, in regard to the above-described compositional formula (1), when $0.25 \geq [y/(2-x)]$, water resistance and oxidation resistance can be further enhanced. From such a viewpoint, it is preferable that $0.25 \geq [y/(2-x)]$; it is more preferable that $0.25 > [y/(2-x)]$; and it is even more preferable that $0.20 \geq [y/(2-x)]$. Above all, when $0.15 [y/(2-x)]$, water resistance and oxidation resistance can be further enhanced.

In regard to the above-described compositional formula (1), the term "(2−x)" may be considered as a value that serves as an index relatively representing the number of S atoms in the weakly bonded $Li_2S$ present in the periphery of the framework part ($PS_4^{3-}$) inside the crystal structure, and the term "y" may be considered as a value representing how much smaller is the number of S atoms in the weakly bonded $Li_2S$ from the stoichiometric composition. Therefore, the term $[y/(2-x)]$ may be considered as an index relatively representing how much the amount of the weakly bonded $Li_2S$ could be reduced from the stoichiometric composition. Thus, it is speculated that water resistance and oxidation resistance can be regulated by regulating the term $[y/(2-x)]$.

In regard to the present solid electrolyte, it is preferable that the solid electrolyte substantially does not contain a phase formed from lithium sulfide ($Li_2S$) or lithium chloride (LiCl). With a single phase of $Li_{7-x-2y}PS_{6-x-y}Cl_x$, the charge-discharge efficiency and the cycle characteristics obtainable when a battery is assembled become more satisfactory, and therefore, it is even more preferable.

Here, the phrase "substantially does not contain a phase formed from lithium sulfide ($Li_2S$) and lithium chloride (LiCl)" means that in the XRD chart, the peak intensities of lithium sulfide ($Li_2S$) and lithium chloride (LiCl) are less than 3% of the peak intensities of $Li_{7-x-2y}PS_{6-x-y}Cl_x$.

It is desirable as long as the present solid electrolyte contains the compound represented by compositional formula (1), and it is acceptable that the solid electrolyte contains unavoidable impurities.

(Moisture Resistance)

In regard to the present solid electrolyte, as explained above, the retention ratio for electrical conductivity after exposure to dry air can be increased to be 50% or higher, or 70% or higher, and the electrical conductivity after exposure to dry air can be increased to be $1.0 \times 10^{-3}$ S·cm$^{-1}$ or higher, or $2.0 \times 10^{-3}$ S·cm$^{-1}$ or higher.

The "dry air" according to the present specification means air in which the moisture concentration has been decreased to 100 ppm or less (dew point: about −42° C. or lower) using an air dryer or the like.

(Ion Conductivity)

It has been known that sulfide-based solid electrolytes originally has excellent ionic conductivity, can easily form an interface with an active material at normal temperature compared to oxides, and can lower the interfacial resistance. Above all, since the present solid electrolyte has fewer sulfur defects and has high crystallinity, the present solid electrolyte has low electron conductivity and particularly excellent lithium ion conductivity.

Furthermore, $Li_7PS_6$ having the same framework structure as that of $Li_{7-x-2y}PS_{6-x-y}Cl_x$ has two crystal structures such as an orthorhombic crystal system (space group Pna2$_1$) having low lithium ion conductivity and a cubic structure (space group F-43 m) having high lithium ion conductivity, and the phase transition temperature is near about 170° C., while the crystal structure near room temperature is an orthorhombic crystal system with low ionic conductivity. Therefore, as disclosed in Patent Document 3, in order to obtain a cubic structure having high ionic conductivity, it is usually necessary to heat the compound once to a temperature higher than or equal to the phase transition temperature, and then treat the compound by rapid cooling. However, in the case of the compound of compositional formula (1), since the compound does not have a phase transition temperature at a temperature higher than or equal to room temperature, and the crystal structure can maintain the cubic form having high ionic conductivity even at room temperature, high ion conductivity can be secured even without performing a treatment such as rapid cooling. Thus, the compound of compositional formula (1) is particularly preferable from this point of view.

(Production Method)

Next, an example of the method for producing the present solid electrolyte will be described. However, the production method explained herein is only an example for illustrative purposes, and the present invention is not intended to be limited to this method.

In regard to the present solid electrolyte, it is preferable to weigh, for example, a lithium sulfide ($Li_2S$) powder, a phosphorus sulfide ($P_2S_5$) powder, and a lithium chloride (LiCl) powder, respectively, and to pulverize and mix the powders with a ball mill, a bead mill, a homogenizer or the like.

At this time, regarding the pulverization and mixing, if the crystallinity of the raw material powders is decreased or amorphized, or the mixed raw material powder is homogenized, through very strong mechanical pulverization and mixing such a mechanical alloying method, the chemical bonds between cations and sulfur atoms are broken, sulfur defects are generated at the time of calcination, and thus electron conductivity is exhibited. Therefore, pulverization and mixing to the extent that crystallinity of the raw material powders can be maintained is desirable.

After the powders are mixed as described above, the mixed powder is dried as necessary, and is subsequently calcined in an inert atmosphere or under the flow of a hydrogen sulfide gas ($H_2S$) stream. The resultant is crushed or pulverized as necessary, and is classified as necessary. Thus, the solid electrolyte can be obtained.

Sulfide materials are likely to have sulfur defects when the temperature rises; therefore, a sulfide material is conventionally encapsulated in a quartz sample or the like, and is calcined. However, it is then difficult to produce a solid electrolyte in an industrial scale. Furthermore, since the encapsulating quartz sample is tightly sealed, the gas contained in the quartz sample expands when the quartz sample is heated, and the pressure inside the quartz sample increases, so that there is a risk of rupture. Therefore, it is necessary to keep a vacuum state as far as possible during encapsulation. However, in a vacuum state, sulfur defects may be easily generated in the sulfide material.

In contrast, since the present solid electrolyte undergoes crystallization from about 200° C., the present solid electrolyte can be synthesized even if the solid electrolyte is calcined at a relatively low temperature. Therefore, the present solid electrolyte, which is a sulfide having the intended chemical composition and almost without any sulfur defects, can be produced by calcining the present solid electrolyte at or above 350° C. in an inert atmosphere or under the flow of a hydrogen sulfide gas ($H_2S$) stream.

Above all, in the case of using hydrogen sulfide gas at the time of calcination, since the partial pressure of sulfur in the vicinity of the calcined sample can be increased by the sulfur gas generated as a result of decomposition of hydrogen sulfide during calcination, sulfur defects are not easily generated even at a high calcination temperature, and electron conductivity can be lowered. Accordingly, in a case in which the solid electrolyte is calcined in an atmosphere containing hydrogen sulfide gas, the calcination temperature is preferably set to 350° C. to 650° C., more preferably to 450° C. or higher and 600° C. or lower, and particularly preferably to 500° C. or higher and 550° C. or lower.

As such, when the present solid electrolyte is calcined under the flow of a hydrogen sulfide gas ($H_2S$) stream, the present solid electrolyte can be calcined without deleting sulfur in the sulfide by calcining the material at 350° C. to 650° C.

On the other hand, in the case of calcining the solid electrolyte in an inert atmosphere, unlike the case of hydrogen sulfide gas, since the partial pressure of sulfur in the vicinity of the calcined sample cannot be increased during calcination, in the case of high calcination temperature, sulfur defects may be easily produced, and electron conductivity is increased. Therefore, in a case in which the solid electrolyte is calcined in an inert atmosphere, it is preferable to adjust the calcination temperature to 350° C. to 500° C., more preferably to 350° C. or higher and 450° C. or lower, and particularly preferably to 400° C. or higher and 450° C. or lower.

Usually, in order to eliminate any unreacted phase by causing the raw material powders to completely react, it is preferable to calcine the solid electrolyte at or above 500° C. by flowing a hydrogen sulfide gas stream. However, in a case in which raw material powders having small particle sizes and high reactivity are used, since the reaction is accelerated even at a low temperature, calcination may be carried out in an inert atmosphere.

Furthermore, since the raw materials described above are very unstable in the atmosphere and thus react with moisture to be decomposed, thereby generating hydrogen sulfide gas or undergoing oxidation, it is preferable to perform calcination by placing the raw materials in a furnace through a glove box purged with an inert gas atmosphere or the like.

When production is achieved in this manner, generation of sulfur defects can be suppressed, and electron conductivity can be lowered. Accordingly, when an all-solid lithium ion battery is produced using the present solid electrolyte, the charge-discharge characteristics and cycle characteristics, which are battery characteristics, can be improved.

<Applications of Present Solid Electrolyte>

The present solid electrolyte can be used as a solid electrolyte layer of an all-solid lithium ion battery or an all-solid lithium primary cell, or as a solid electrolyte that is mixed with an electrode mixture for positive electrode or negative electrode.

For example, an all-solid lithium ion battery can be constructed by forming a positive electrode, a negative electrode, and a layer formed from the above-mentioned solid electrolyte between the positive electrode and the negative electrode.

At this time, since the present solid electrolyte has excellent water resistance and oxidation resistance and undergoes deterioration of characteristics to a reduced extent even if the solid electrolyte is handled in dry air, the operation of assembling an all-solid lithium ion battery can be carried out even in, for example, a dry room.

Here, a layer formed from a solid electrolyte can be produced by forming a coating film by, for example, a method of dropping a slurry composed of the solid electrolyte, a binder and a solvent on a substrate, and cutting the substrate by rubbing with a doctor blade or the like; a method of contacting a substrate with the slurry, and then cutting the substrate with an air knife; or a screen printing method, and then eliminating the solvent through heating and drying. Alternatively, such a layer can also be produced by producing a green compact from a powder of the solid electrolyte using a press or the like, and then appropriately processing the green compact.

As the positive electrode material, any positive electrode material that is used as a positive electrode active material for lithium ion batteries can be used as appropriate.

Also regarding the negative electrode material, any negative electrode material that is used as a negative electrode active material for lithium ion batteries can be used as appropriate. However, since the present solid electrolyte is electrochemically stable, a carbon-based material such as artificial graphite, natural graphite, or non-graphitizing carbon (hard carbon), all of which are charged and discharged at a low potential comparable to that of lithium metal (about 0.1 V vs. Li$^+$/Li), can be used. Accordingly, when a carbon-based material is used for the negative electrode material, the energy density of the all-solid lithium ion battery can be significantly increased. Therefore, for example, a lithium ion battery having a negative electrode active material containing the present solid electrolyte and carbon such as artificial graphite, natural graphite, or non-graphitizing carbon (hard carbon) can be constructed.

<Definition of Terms>

The "solid electrolyte" according to the present invention means any kind of material in which ions, for example, Li+, can move around while the material is in a solid state.

Furthermore, when it is described as "X to Y" (X and Y are arbitrary numbers) in regard to the present invention, unless particularly stated otherwise, the description includes the meaning of "X or more and Y or less" as well as the meaning of "preferably more than X" or "preferably less than Y".

Also, when it is described as "X or more" (X is an arbitrary number) or "Y or less" (Y is an arbitrary number), the meaning intended to imply that the value is "preferably larger than X" or "preferably smaller than Y".

EXAMPLES

Hereinafter, the present invention will be explained based on Examples. However, the present invention is not intended to be construed to be limited to these.

Examples and Comparative Examples

A lithium sulfide ($Li_2S$) powder, a phosphorus sulfide ($P_2S_5$) powder, and a lithium chloride (LiCl) powder were used to make up the compositional formulas indicated in Table 1, and the powders were weighed so that the total amount became 5 g. The powders were pulverized and mixed for 15 hours in a ball mill, and thus a mixed powder was produced. This mixed powder was charged into a container made of carbon, and this was calcined in a tubular electric furnace for 4 hours at 500° C. at a rate of temperature increase of 200° C./h while a stream of hydrogen sulfide gas ($H_2S$, purity 100%) was flowed at a rate of 1.0 L/min. Subsequently, the sample was crushed with a mortar and a pestle, and the size of the crushed product was regulated with a sieve having a mesh size of 53 μm. Thus, a powdered sample was obtained.

At this time, the operations of weighing, mixing, mounting in an electric furnace, removal from the electric furnace, crushing and size regulation were all carried out in a glove box that had been purged with sufficiently dried Ar gas (dew point: −60° C. or lower).

<Analysis of Composition>

For the samples obtained in the Examples and Comparative Examples, the compositions were analyzed by an ICP emission analysis method.

<Characterization of Produced Phases>

The powdered samples obtained in the Examples and Comparative Examples were analyzed by an X-ray diffraction method (XRD), and the produced phases were characterized.

<Measurement of Initial Electrical Conductivity>

Each of the samples obtained in the Examples and Comparative Examples was subjected to uniaxial press molding at a pressure of 200 MPa in a glove box that had been purged with sufficiently dried Ar gas (dew point: −60° C. or lower), and a pellet having a diameter of 10 mm and a thickness of 2 to 5 mm was produced. A carbon paste was applied on the two surfaces at the top and the bottom of the pellet as electrodes, and then the pellet was heat treated for 30 minutes at 180° C. Thus, a sample for measuring ionic conductivity was produced. Measurement of the ionic conductivity was carried out by an alternating current impedance method at room temperature (25° C.)

<Measurement of Electrical Conductivity after Exposure to Dry Air>

Each of the samples obtained in the Examples and Comparative Examples was placed in a glove box that had been purged with dry air having an average dew point of −45° C. and was left to stand there for 6 hours. Subsequently, the sample was placed again in a glove box that had been purged with sufficiently dried Ar gas (dew point: −60° C. or lower), and the ionic conductivity was measured in the same manner as in the measurement of the initial electrical conductivity.

"x" and "y" in Table 1 represent x and y of compositional formula: $Li_{7-x-2y}PS_{6-x-y}Cl_x$ respectively, and the "$Li_2S$ excess-deficiency proportion" represents the relation between x and y in the corresponding compositional formula, that is, [y/(2−x)]. The term "initial" represents the initial electrical conductivity, the term "6 h of exposure to dry air" represents the electrical conductivity after exposure to dry air for 6 hours, and the "retention ratio for electrical conductivity" represents the retention proportion (%) for electrical conductivity after exposure to dry air for 6 hours with respect to the initial electrical conductivity.

Furthermore, in regard to the items for the produced phases in Table 1, "A" represents the $Li_{7-x-2y}PS_{6-x-y}Cl_x$ phase having a cubic argyrodite type crystal structure, and "A+$Li_3PS_4$" represents a mixed phase of the $Li_{7-x-2y}PS_{6-x-y}Cl_x$ phase and the $Li_3PS_4$ phase. Furthermore, "A+$Li_3PS_4$ (small)" means that $Li_3PS_4$ is confirmed in the XRD chart, and the peak intensity of the phase is less than 3% of the peak intensity of $Li_{7-x-2y}PS_{6-x-y}Cl_x$.

$0.20 \geq [y/(2-x)]$. It was also found that particularly when $0.15 \geq [y/(2-x)]$, water resistance and oxidation resistance can be further enhanced.

<Production and Evaluation of All-Solid Battery Cell>

All-solid batteries were produced using the samples obtained in Examples 2 and 6 and Comparative Examples 1 and 5 as solid electrolytes, and preparing the positive electrode mixture and the negative electrode mixture, and an evaluation of the battery characteristics (charge-discharge capacity of the first cycle, efficiency, and rate characteristics) was carried out.

TABLE 1

| Example/ Comparative Example | Solid electrolyte Compositional formula | x | y | $Li_2S$ excess-deficiency proportion [y/(2 − x)] | Produced phase | Initial electrical conductivity $\sigma_o$ [S·cm$^{-1}$] | Electrical conductivity after 6 h of exposure to dry air $\sigma_e$ [S·cm$^{-1}$] | Retention ratio for electrical conductivity [%] |
|---|---|---|---|---|---|---|---|---|
| Example 1 | $Li_{6.08}PS_{5.14}Cl_{0.8}$ | 0.8 | 0.06 | 0.05 | A | 1.71E-03 | 1.03E-03 | 60.4 |
| Example 2 | $Li_{5.9}PS_{4.95}Cl_{1.0}$ | 1.0 | 0.05 | 0.05 | A | 2.41E-03 | 2.02E-03 | 83.9 |
| Example 3 | $Li_{5.54}PS_{4.57}Cl_{1.4}$ | 1.4 | 0.03 | 0.05 | A | 4.00E-03 | 2.82E-03 | 70.5 |
| Example 4 | $Li_{5.9}PS_{5.05}Cl_{0.8}$ | 0.8 | 0.15 | 0.125 | A | 1.70E-03 | 1.23E-03 | 72.1 |
| Example 5 | $Li_{5.75}PS_{4.875}Cl_{1.0}$ | 1.0 | 0.13 | 0.125 | A | 2.31E-03 | 2.00E-03 | 86.7 |
| Example 6 | $Li_{5.6}PS_{4.7}Cl_{1.2}$ | 1.2 | 0.10 | 0.125 | A | 2.81E-03 | 2.74E-03 | 97.7 |
| Example 7 | $Li_{5.3}PS_{4.35}Cl_{1.6}$ | 1.6 | 0.05 | 0.125 | A | 4.79E-03 | 2.46E-03 | 51.4 |
| Example 8 | $Li_{5.6}PS_{4.9}Cl_{0.8}$ | 0.8 | 0.30 | 0.25 | A + Li3PS4 (small) | 1.72E-03 | 1.37E-03 | 79.8 |
| Example 9 | $Li_{5.5}PS_{4.75}Cl_{1.0}$ | 1.0 | 0.25 | 0.25 | A + Li3PS4 (small) | 2.56E-03 | 1.43E-03 | 55.8 |
| Example 10 | $Li_{5.4}PS_{4.6}Cl_{1.2}$ | 1.2 | 0.20 | 0.25 | A | 3.78E-03 | 1.94E-03 | 51.3 |
| Example 11 | $Li_{5.3}PS_{4.45}Cl_{1.4}$ | 1.4 | 0.15 | 0.25 | A | 1.82E-03 | 1.48E-03 | 81.3 |
| Comparative Example 1 | $Li_{5.0}PS_{4.7}Cl_{0.6}$ | 0.6 | 0.70 | 0.50 | A + Li3PS4 | 8.99E-04 | 5.50E-04 | 61.2 |
| Comparative Example 2 | $Li_{5.0}PS_{4.05}Cl_{1.9}$ | 1.9 | 0.05 | 0.50 | Li3PS4 + A (small) + LiCl | 5.17E-06 | 1.05E-07 | 2.0 |
| Comparative Example 3 | $Li_{4.2}PS_{4.4}Cl_{0.4}$ | 0.4 | 1.20 | 0.75 | A + Li3PS4 | 4.20E-04 | 3.35E-04 | 79.8 |
| Comparative Example 4 | $Li_{6.8}PS_{5.8}Cl_{0.2}$ | 0.2 | 0.00 | 0.00 | A | 3.90E-04 | 3.89E-04 | 99.7 |
| Comparative Example 5 | $Li_{5.2}PS_{4.2}Cl_{1.8}$ | 1.8 | 0.00 | 0.00 | A + Li3PS4 (small) + LiCl (small) | 9.91E-04 | 1.68E-04 | 17.0 |

From the results of Table 1 and the results of the tests carried out so far, it was found that in regard to the compound represented by compositional formula: $Li_{7-x-2y}PS_{6-x-y}Cl_x$, when the conditions: $0.8 \leq x \leq 1.7$ and $0 < y \leq -0.25x+0.5$ are satisfied, the retention ratio for electrical conductivity after exposure to dry air can be increased to 50% or higher, and the electrical conductivity after exposure to dry air can be increased to $1.0 \times 10^{-3}$ S·cm$^{-1}$ or higher.

Furthermore, it was also found that when the conditions: $1.0 \leq x \leq 1.4$ and $0 < y \leq -0.2x+0.4$ are satisfied, the retention ratio for electrical conductivity after exposure to dry air can be increased to 70% or higher, and the electrical conductivity after exposure to dry air can be increased to $2.0 \times 10^{-3}$ S·cm$^{-1}$ or higher.

Furthermore, in the above-described compositional formula (1), it was also found that when $0.25 \leq [y/(2-x)]$, water resistance and oxidation resistance can be further enhanced. From such a viewpoint, it was found that it is more preferable that $0.25 > [y/(2-x)]$, and it is even more preferable that (Materials)

A powder obtained by coating $LiNi_{0.5}Co_{0.2}Mn_{0.3}O_2$ (NCM), which is a ternary layered compound, with a $ZrO_2$ film was used as the positive electrode active material, graphite was used as the negative electrode active material, and the samples obtained in the Examples and Comparative Examples were used as solid electrolyte powders.

(Preparation of Electrode Mixture)

A positive electrode mixture powder was prepared by mixing a positive electrode active material powder, a solid electrolyte powder, and a conduction supporting agent (acetylene black) powder in a ball mill at a ratio of 60:38:2.

A negative electrode mixture powder was prepared by mixing a negative electrode active material powder and a solid electrolyte powder in a ball mill at a ratio of 50:50 as a mass ratio.

(Production of All-Solid Battery Cell)

The positive electrode mixture powder that used each of the samples (solid electrolyte powders) obtained in the Examples and Comparative Examples was charged into a mold, and the positive electrode mixture powder was uniaxially molded at 500 MPa. Thus, a positive electrode mixture pellet having a diameter of ϕ10 mm was produced.

Subsequently, a cylinder made of SUS and having a diameter of ϕ13 mm that would serve as an electrode on the positive electrode side was inserted into an insulated tube for sealed cell having a diameter of ϕ13 mm, and the positive electrode mixture pellet was placed at the center. Furthermore, each of the samples (solid electrolyte powders) obtained in the Examples and Comparative Examples was charged thereon, and the system was uniaxially molded at 200 MPa. Thus, a laminated pellet of solid electrolyte-positive electrode mixture was produced. Subsequently, the negative electrode mixture powder was charged on the laminated pellet of solid electrolyte-positive electrode mixture, and the system was uniaxially molded at 500 MPa. Thereby, an all-solid cell element having a laminated pellet shape composed of negative electrode mixture-solid electrolyte-positive electrode mixture was produced. Subsequently, a cylinder made of SUS and having a diameter of ϕ13 mm that would serve as an electrode for the negative electrode was inserted into the insulated tube through the negative electrode mixture side of the laminated pellet, and the all-solid cell element that had been inserted into the insulated tube was introduced into a sealed type battery cell made of SUS to obtain an all-solid battery cell.

At this time, in regard to the production of the all-solid battery cell, the processes up to the production of the all-solid cell element were carried out in a glove box purged with dry air having an average dew point of −45° C., and the subsequent processes for the production of the all-solid battery cell were carried out in a glove box purged with sufficiently dried Ar gas (dew point: −60° C. or lower).

(Analysis of Battery Characteristics)

Regarding an analysis of battery characteristics, the all-solid battery cell was introduced into an environmental tester maintained at 25° C., the all-solid battery cell was connected to a charge-discharge analyzer, and an evaluation was carried out. At this time, charging was performed in the CC-CV mode by setting the upper limit voltage to 4.2 V, and discharging was performed in the CC mode by setting the lower limit voltage to 2.5 V. Charging and discharging was achieved at 0.064 mA/cm$^2$ (0.05 C) in the first cycle, and at 0.13 mA/cm$^2$ (0.1 C) in the second cycle. For the subsequent cycles, charging was performed at 0.13 mA/cm$^2$ (0.1 C), and discharging was performed at 0.25 mA/cm$^2$ (0.2 C) in the fourth cycle, at 0.64 mA/cm$^2$ (0.5 C) in the fifth cycle, at 1.27 mA/cm$^2$ (1 C) in the sixth cycle, at 2.54 mA/cm$^2$ (2 C) in the seventh cycle, at 3.82 mA/cm$^2$ (3 C) in the eighth cycle, at 6.37 mA/cm$^2$ (5 C) in the ninth cycle, and at 12.7 mA/cm$^2$ (10 C) in the tenth cycle. For the rate characteristics, the capacity retention ratio was calculated based on the discharge capacities of various cycles while taking the discharge capacity of the second cycle as 100%. Table 2 shows the results of the charge-discharge capacity of the first cycle and the rate characteristics.

TABLE 2

| Example/ Comparative Example | Solid electrolyte compositional formula | Charge capacity of first cycle [mAh · g$^{-1}$] | Discharge capacity of first cycle [mAh · g$^{-1}$] | Rate characteristics Capacity retention ratio [%] | | | |
|---|---|---|---|---|---|---|---|
| | | | | 1 C | 2 C | 5 C | 10 C |
| Example 2 | Li$_{5.9}$PS$_{4.95}$Cl$_{1.0}$ | 203.3 | 156.8 | 89.1 | 80.7 | 61.1 | 31.9 |
| Example 6 | Li$_{5.6}$PS$_{4.7}$Cl$_{1.2}$ | 222.7 | 163.8 | 85.9 | 85.9 | 78.9 | 63.9 |
| Comparative Example 1 | Li$_{5.0}$PS$_{4.7}$Cl$_{0.6}$ | 184.5 | 141.4 | 82.7 | 52.2 | No discharge | No discharge |
| Comparative Example 5 | Li$_{5.2}$PS$_{4.2}$Cl$_{1.8}$ | 197.8 | 139.1 | 83.4 | 50.3 | No discharge | No discharge |

It is known that when a positive electrode active material having a layered structure, such as NCM, is used, since such a material has an irreversible capacity, the discharge capacity (of the first cycle) becomes lower with respect to the charge capacity of the first cycle. However, the all-solid batteries using the samples of Examples 2 and 6 had high discharge capacities of the first cycle and highly satisfactory rate characteristics, and could be discharged even at 12.7 mA/cm$^2$ (10 C). Since the solid electrolytes that use these all-solid batteries have high ionic conductivities and have high water resistance and oxidation resistance, even if the all-solid batteries were produced in a dry air atmosphere, the solid electrolytes were not deteriorated and could maintain high ionic conductivities. Therefore, it is believed that the all-solid batteries can exhibit high performance also as battery characteristics.

On the other hand, the all-solid batteries that used the samples of Comparative Examples 1 and 5 exhibited lowered discharge capacities of the first cycle, as compared to the all-solid batteries produced with the samples of Examples 2 and 6. Furthermore, also regarding the rate characteristics, discharging did not occur at 6.37 mA/cm$^2$ (5 C) or higher.

Since the solid electrolytes used in these all-solid batteries have low water resistance and oxidation resistance, when the all-solid batteries are produced in a dry air atmosphere, the solid electrolytes are deteriorated, and the ionic conductivities are decreased. When such a solid electrolyte is used in an all-solid battery, the internal resistance of the all-solid battery thus produced becomes high. Even if such an all-solid battery is discharged, since the decrement in voltage is large, the voltage immediately reaches the lower limit voltage. Therefore, it is considered that the discharge capacity is small even at a low rate, and even at a higher rate, discharge does not occur.

The invention claimed is:

1. A sulfide-based solid electrolyte for lithium ion batteries comprising a compound having a cubic argyrodite type crystal structure, wherein the compound is represented by compositional formula (1): Li$_{7-x-2y}$PS$_{6-x-y}$Cl$_x$, and in the compositional formula (1), conditions: $0.8 \leq x \leq 1.7$ and $0 < y \leq -0.25x + 0.5$ are satisfied.

2. The sulfide-based solid electrolyte for lithium ion batteries according to claim 1, wherein in the compositional formula (1), conditions: $1.0 \leq x \leq 1.4$ and $0 < y \leq -0.2x + 0.4$ are further satisfied.

3. The sulfide-based solid electrolyte for lithium ion batteries according to claim 1, wherein in the compositional formula (1), condition: $0.15 \geq [y/(2-x)]$ is further satisfied.

4. The sulfide-based solid electrolyte for lithium ion batteries according to claim 1, wherein the sulfide-based solid electrolyte is obtained by mixing a lithium sulfide ($Li_2S$) powder, a phosphorus sulfide ($P_2S_5$) powder, and a lithium chloride (LiCl) powder, and calcining the mixture at 350° C. to 500° C. in an inert atmosphere, or calcining the mixture at 350° C. to 650° C. in an atmosphere containing hydrogen sulfide gas.

5. A lithium ion battery comprising the solid electrolyte according to claim 1.

6. A lithium ion battery comprising a negative electrode active material containing the solid electrolyte according to claim 1 and carbon.

7. The sulfide-based solid electrolyte for lithium ion batteries according to claim 2, wherein in the compositional formula (1), condition: $0.15 \geq [y/(2-x)]$ is further satisfied.

8. The sulfide-based solid electrolyte for lithium ion batteries according to claim 2, wherein the sulfide-based solid electrolyte is obtained by mixing a lithium sulfide ($Li_2S$) powder, a phosphorus sulfide ($P_2S_5$) powder, and a lithium chloride (LiCl) powder, and calcining the mixture at 350° C. to 500° C. in an inert atmosphere, or calcining the mixture at 350° C. to 650° C. in an atmosphere containing hydrogen sulfide gas.

9. The sulfide-based solid electrolyte for lithium ion batteries according to claim 3, wherein the sulfide-based solid electrolyte is obtained by mixing a lithium sulfide ($Li_2S$) powder, a phosphorus sulfide ($P_2S_5$) powder, and a lithium chloride (LiCl) powder, and calcining the mixture at 350° C. to 500° C. in an inert atmosphere, or calcining the mixture at 350° C. to 650° C. in an atmosphere containing hydrogen sulfide gas.

10. A lithium ion battery comprising the solid electrolyte according to claim 2.

11. A lithium ion battery comprising the solid electrolyte according to claim 3.

12. A lithium ion battery comprising the solid electrolyte according to claim 4.

13. A lithium ion battery comprising a negative electrode active material containing the solid electrolyte according to claim 2 and carbon.

14. A lithium ion battery comprising a negative electrode active material containing the solid electrolyte according to claim 3 and carbon.

15. A lithium ion battery comprising a negative electrode active material containing the solid electrolyte according to claim 4 and carbon.

* * * * *